United States Patent
Hygh et al.

(10) Patent No.: US 12,189,393 B2
(45) Date of Patent: Jan. 7, 2025

(54) METHOD AND SYSTEM FOR CONTROLLING MOVEMENT OF A DEVICE

(71) Applicant: SPHERO, INC., Boulder, CO (US)

(72) Inventors: David E. Hygh, Henderson, NV (US); James William Konish, Amherst, NH (US); Ting Cao, Highlands Ranch, CO (US)

(73) Assignee: SPHERO, INC., Greenville, TX (US)

( * ) Notice: Subject to any disclaimer, the term of this patent is extended or adjusted under 35 U.S.C. 154(b) by 0 days.

(21) Appl. No.: 18/057,723

(22) Filed: Nov. 21, 2022

(65) Prior Publication Data

US 2023/0333561 A1  Oct. 19, 2023

Related U.S. Application Data

(63) Continuation of application No. 16/788,277, filed on Feb. 11, 2020, now Pat. No. 11,507,096.

(51) Int. Cl.
G05B 11/42 (2006.01)
G05D 1/00 (2006.01)

(52) U.S. Cl.
CPC .......... G05D 1/0212 (2013.01); G05B 11/42 (2013.01)

(58) Field of Classification Search
CPC ....... G05D 1/0212; G05D 1/027; G05B 11/42
See application file for complete search history.

(56) References Cited

U.S. PATENT DOCUMENTS 8,972,059 B2   3/2015  Moriyama et al.
2009/0153349 A1  6/2009  Lin et al.

2012/0013275 A1   1/2012  Angelis et al.
2016/0293464 A1  10/2016  Wada
2017/0028558 A1   2/2017  Nishi et al.
(Continued)

FOREIGN PATENT DOCUMENTS

| CN | 105814442 A | 7/2016 |
| WO | 2012/018168 A1 | 2/2012 |
| WO | 2015/051046 A1 | 4/2015 |

OTHER PUBLICATIONS

Hassan, Sabo Miya, et al. "Spiral dynamic algorithm based optimal PPI controller for WirelessHART networked systems." 2017 IEEE 3rd International Symposium in Robotics and Manufacturing Automation (ROMA). IEEE, 2017. (Year: 2017).*

(Continued)

*Primary Examiner* — Christopher E. Everett

(57) ABSTRACT

Methods and systems are disclosed for controlling device movement based on a movement command. Issues on accurately controlling movement of a device such as a programmable robot and rover are addressed by first determining a command type of the movement command, followed by determining specific types of controllers for a high-level controller and a low-level controller based on the determined command type. When the command type is a linear movement, a Proportional-Integral-Derivative (PID) controller is used at the high-level controller and a Proportional/Proportional-Integral (PPI) controller is used at the low-level controller to accurately control a target distance. When the command type is an angular movement, the PPI controller is used at the high-level controller and the PID controller is used at the low-level controller to accurate control the end-heading of the device.

20 Claims, 7 Drawing Sheets

(56) References Cited

U.S. PATENT DOCUMENTS

| | | |
|---|---|---|
| 2017/0160751 A1 | 6/2017 | Pierce et al. |
| 2019/0004482 A1 | 1/2019 | Akihiro |
| 2019/0160682 A1 | 5/2019 | Sato et al. |
| 2019/0207810 A1 | 7/2019 | Seely et al. |
| 2021/0247768 A1 | 8/2021 | Hygh et al. |

OTHER PUBLICATIONS

Johansson, Per. "An Adaptive PPI Controller." MSc Theses (2001) (Year: 2001).*

Jul-Ki Seok, et all. Automatic Mode Switching of P/PI Speed Control for Industry Servo Drives Using Online Spectrum Analysis of Torque Command, Oct. 2007, IEEE Transactions on Industrial Electronics, vol. 54, No. 5, (Year: 2007).

Larsson, P., and Tore Hagglund. "Comparison between robust PID and predictive PI controllers with constrained control signal noise sensitivity." IFAC Proceedings vols. 45.3 (2012): 175-180. (Year: 2012).

Lopez, Kevin, Ruben Garrido, and Sabine Mondie. "Cascade proportional integral retarded control of servodrives." Proceedings of the Institution of Mechanical Engineers, Part I: Journal of Systems and Control Engineering 232.6 (2018): 662-671. (Year: 2018).

Sabo Miya Hassan, et all. Spiral dynamic algorithm based optimal PPI controller for WirelessHART networked systems, 2017, IEEE 3rd International Symposium on Robotics and Manufacturing Automation (ROMA) (Year: 2017).

Salas, Francisco G., et al. "Astable proportional-proportional integral tracking controller with self-organizing fuzzy-tuned gains for parallel robots." International Journal of Advanced Robotic Systems 16.1 (2019). (Year: 2019).

Salas, Francisco G., et al. "Stability analysis of a dual-loop P-PI controller with variable gains for parallel manipulators." 2017 14th International Conference on Electrical Engineering, Computing Science and Automatic Control (CCE). IEEE, 2017. (Year: 2017).

* cited by examiner

| Command ID | Linear Velocity | Linear End Position | Angular Velocity | End Heading | Time Duration |
|---|---|---|---|---|---|
| 0001 | 1 | 5 | 0 | 0 | 5 |
| 0002 | 0 | 0 | 10 | 90 | 9 |
| 0003 | 1 | 5 | 0 | 90 | 5 |
| 0004 | 0 | 0 | 10 | 180 | 9 |
| 0005 | 1 | 5 | 0 | 180 | 5 |
| 0006 | 0 | 0 | 10 | 270 | 9 |
| 0007 | 1 | 5 | 0 | 270 | 5 |
| 0008 | 0 | 0 | 10 | 0 | 9 |

METHOD AND SYSTEM FOR CONTROLLING MOVEMENT OF A DEVICE

BACKGROUND

Computer-based movable devices, programmable rovers and robots, for example, have become widely available as prices of various sensors and other parts have become reasonable for use in education and entertainment settings. Such parts may include sensors such as inertia measurement sensors, and motors with moving parts, such as wheels and tread, for example.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by having an high-level controller receiving a movement command that specifies, determining a movement type based on the received movement command, determining an high-level controller for controlling a destination of the device movement based on the movement command and a lower-level controller correcting a deviation of the device movement toward the destination as the device moves based on the movement type.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 1A illustrates an overview of an example system for a device movement control system in according to aspects of the present disclosure.

FIGS. 1B-C illustrate exemplary diagrams of a device movement control system in accordance with aspects of the present disclosure.

FIG. 2 illustrates an example of methods of controlling movement of a device in accordance with aspects of the present disclosure.

FIGS. 3A-B illustrate examples of movement commands and device movement according to an example system with which the disclosure may be practiced in accordance with aspects of the present disclosure.

DETAILED DESCRIPTION

Figure 1A:
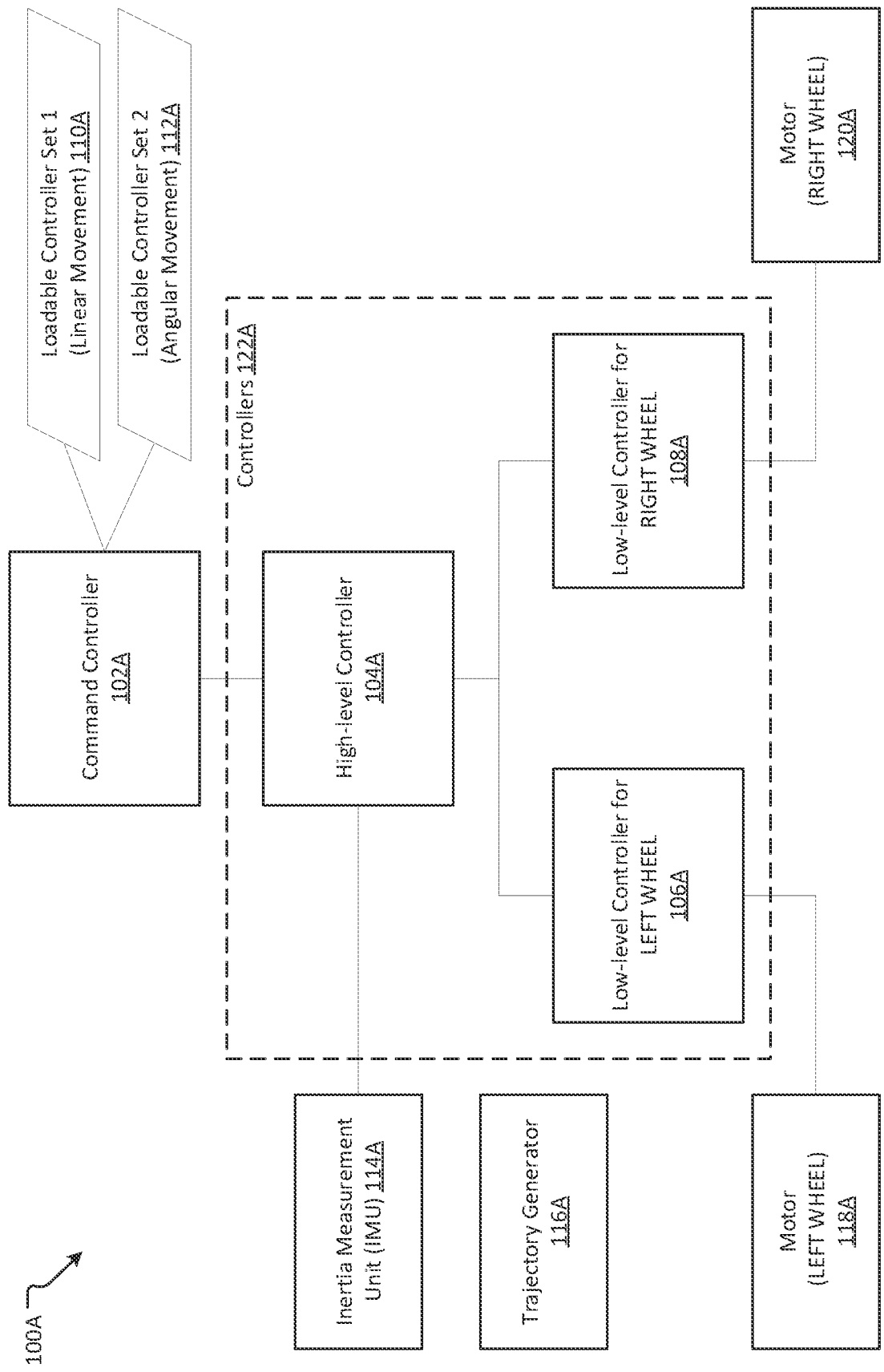

Various aspects of the disclosure are described more fully below with reference to the accompanying drawings, which form a part hereof, and which show specific example aspects. However, different aspects of the disclosure may be implement in many different forms and should not be construed as limited in the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure relates to systems and methods for controlling device movement based on a movement command. As sensors and parts used for rovers and robots have become readily available, programmable rovers and robots for consumers and educational purposes are being introduced. For example, a programmable rover may provide opportunities for users to program the rover using one or more movement commands and execute the program to control the movement.

In some aspect, controlling a movement of a device such as a rover or a robot involves generating series of complex commands and detailed path planning. Such planning requires, for example, specifying a movement path that includes a start point, multiple way points along the path, and an end point to stop the movement. While controlling movement of the device based on waypoints may accommodate movement of the device along a complex path, programming with less burden to a user may be desirable when the device is used for entertainment and educational purpose.

For the programmable rover to be useful in settings such as entertainment and education, accommodating movement commands that are intuitive and easy may become an issue. In a case of a programmable rover with a set of treads or wheels, for example, a movement command may take a form of a signal level for each motor that attaches to respective treads or wheels. However, it may be more intuitive for the user to thinking about the device movement in terms of speed, time, and directions of the programmable rover as a whole, instead directly adjusting signal input levels to individual motors to control rotations. For programming a linear device movement, it may be desirable to enable a user to control a device movement by specifying start and end positions and time duration of the device, for example, instead of directly specifying signal levels to motors that cause the left wheel and the right wheel to rotate respectively. Similarly, controlling an angular movement of the device may be more intuitively controlled by using a set of parameters such as an angular velocity and the heading of the device, forming an arc with a specific radius and time duration.

In some aspect, a device may provide at least two modes of movement: a linear movement and an angular movement. The linear movement is movement in a straight line. The angular movement is a movement along an arc with a specified radius. Parameters of a movement command to control the device may include a linear velocity, a linear end position or distance of the movement, an angular velocity, an end heading, and a time duration. The linear velocity describes a velocity of the device in motion in terms a distance per a unit of time, such as a number of millimeters per second, for example. The linear end position describes a distance that the device needs to move, a number of centimeters, for example, at a completion of executing the movement command. The angular velocity specifies a degree of angle per unit of time, 10 counter-clockwise degrees per second, for example, for the device to turn. The end heading specifies a degree in angle, 90 degrees for example, where the device needs to be positioned at the completion of executing the movement command. A time duration, 10 seconds for example, specifies a time duration of executing the movement command. The device movement command has a command type of a linear movement when the device movement command specifies its angular velocity as zero. The device movement command has a command type of an angular movement when a linear velocity is zero.

In some aspect, a combination of different types of controllers may control the device movement: a Proportional/Proportional-Integral (PPI) controller and a Proportional-Integral-Derivative (PID) controller. In some aspect, a PPI controller is used as the high-level controller for an angular movement and used as the low-level controller(s) for a linear movement, receives a trajectory profile from a trajectory generator. The trajectory generator processes a given movement command and the current position, orientation, and movement of the device to generate the trajectory profile. The trajectory profile include information that relates to how the device ramps up or reduces its speed or orienting its direction, based on a given movement command with a target movement. In some aspect, the trajectory profile includes a current position of the device, a new position of the device, and a position derivative of the device. As the device is a physical device, there is an inherent time lag between when a movement command with a target movement, such as a linear velocity, is issued and the device actually performs the movement, as the motor(s) need to change rotation from being a stationary to a motion at a speed as specified by the movement command. That is, there is a time lag between a time when a movement command instructs the device to move at a linear velocity of 50 millimeters per second and a time that the device is actually in motion at the linear velocity of 50 millimeters per second, for example, because the motors need to ramp up its speed of rotation before reaching the speed as instructed. Similarly, there may be a time lag between the time of issuing a movement command to stop movement and the time when the device actually stops its movement.

Use of the controllers in a multi-layer hierarchy enables designing movement commands in multiple layers of schema for controlling device movement. In some aspect, a user may define a movement command describing starting and ending of a movement at a specific time, without plotting way points with coordinates and instructing how to correct any deviation of the movement path while the device is in movement in details. A movement command for a linear movement may be expressed by a combination of any two parameters based on a linear velocity, a linear end position, and a time duration of the movement, for example, when an angular velocity has a value of zero. A movement command for an angular movement may be expressed by a combination of a linear velocity and any two parameters based on an angular velocity, an end heading of the device, and a time duration of the movement, for example. In some other aspect, a movement command for an angular movement may be expressed by a combination of a turn radius and any two parameters based on an angular velocity, an end heading of the device, and a time duration of the movement.

The high-level controller may receive the movement command describing starting and ending of the movement at the specific time and convert the movement command into instructions when there is a deviation between the intended course of movement and the actual status of the device. The high-level controller may receive inertia measurement data from on-board sensors, which may be encoders, gyroscope, and magnetometer and/or remote sensors, for example to determine the current orientation and movement of the device. The high-level controller provides the converted instructions to the low-level controllers. In some aspect, there may be one low-level controller for each motor that causes device movement using a wheel, a tread, a belt, a propeller, etc. In another example with a programmable rover robot having two wheels, there may be a first motor that drives a right wheel and a second motor that drives a left wheel. There may be one low-level controller for the first motor and another low-level controller for the second motor. The low-level controllers receives the instructions from the high-level controllers and further converts the instructions into signal levels, which is another scheme of instructions as may expressed in terms of electric voltage, as input to respective motors. One of skill in the art will appreciate that the aspects disclosed herein may be performed with a device having any number of motors or propulsion components and may employ one or more high-level and low-level controllers.

Furthermore, the layered controllers provide a benefit of minimizing deviations of an actual state of the device movement from the state of the device movement as specified by a movement command. It is inevitable that the actual movement lags behind the movement command because there is a time lag between a time when a motor is instructed to rotate at a rate that corresponds to a particular input signal level and a time when the motor is actually rotating at that rate. A time is needed for the rotation speed to change based on the instruction. A PID controller comprises a series of three internal controllers for error adjustment: a Proportional, an Integral, and a Derivative adjusters. In some aspect, the proportional portion of the controller adjusts the speed of the device to recover from the time delay of the actual movement to catch up. The integral portion of the controller aggregates the error or the deviation of actual state of the device from the movement command over time. The derivative portion of the controller minimizes the potential overshoot as the controller adjusts the speed to recover from the time delay and catch up to the state as specified by the movement command. Combinations and types of controllers is not limited to PID controllers and PPI controllers. Other types of controllers may be used to control the device movement based on movement commands.

FIG. 1A illustrates an overview of an example system for a device movement control system in according to aspects of the present disclosure. System 100A may represent a set of controllers, sensors, and motors of an exemplar programmable rover device for example. Command controller 102A receives a movement command to execute on the device. In some aspect, a movement command includes at least a following set of input parameters: a linear velocity, a linear end position, an angular velocity, an end heading. In some aspects, a time duration may be used in place of a linear end position and an end heading. A loadable controller set 1 (Linear Movement) 110A may include a set of controllers to be loaded and be used to control the device movement when a command type of the movement command is a linear movement. The loadable controller set #1 (Linear Movement) 110A may specify a PID controller as a high-level controller and a PPI controller as a lower-level controller, for example. The loadable controller set #2 (Angular Movement) 112A may specify a PPI controller as a high-level controller and a PID controller as a lower-level controller. A structure of the controllers 122A in hierarchy is shown in FIG. 1A. Command controller 102A communicates with a high-level controller 104A by transmitting a movement command to the high-level controller 104A. The high-level controller 104A receives data from the Inertia Measurement Unit (IMU) 114A. The data from IMU 114A includes measurement data by one or more on-board sensors that are attached in the device. IMU 114A and associated on-board sensors provide information that relates to forces on the device, angular rate of movement, and the orientation of the device, for example. While not shown in FIG. 1A, the one or more on-board sensors include but not limited to accelerometers, gyroscopes, and magnetometers.

A trajectory generator 116A generates a trajectory profile of a movement as the device performs the movement based on a movement command. In some aspect, the trajectory generator 116A calculates a new point of the device movement and where the device is supposed to be in an ideal case as instructed by the movement command, and what velocity the device should be to meet the movement as instructed by the movement command. The trajectory profile include information that relates to how the device increases or reduces its speed and/or orients its direction, based on a given movement command with a target movement. In some aspect, the trajectory profile includes a current position of the device, a new position of the device, and a position derivative of the device. In case where the device is instructed to perform a linear movement, the position derivative is a linear velocity at an integral of the current position and the new position in order to attain the device movement as instructed by the movement command. That is, the device needs to catch up with the required movement when the movement of the device thus far is short in a movement distance, moving off the straight line or the arc movement as instructed by the movement command. In a linear movement, for example, the trajectory profile provides how the device need to ramp up or reduce its actual linear velocity based on a given linear velocity as a target speed based on the movement command. In an angular movement, for example, the trajectory profile includes information on how the device ramps up its angular velocity to reach a steady angular velocity as specified by the movement command, slows down its angular velocity, and stops at a desired heading as specified by the movement command.

In some aspect, the trajectory generator 116A may provide a trajectory profile to PPI controller. The PPI controller may receive the trajectory profile to adjust the device's movement with respect to ramping up the speed of the movement, maintaining the movement, slowing down the movement, and stop the movement according to the movement command.

A high-level controller 104A may connect to one or more low-level controllers. In some aspect, the device may include one low-level controller for each motor of the two wheels. In other aspects, one low-level controller may control multiple motors. As shown in FIG. 1A, the high-level controller 104A connects with a low-level controller 106A for the left wheel and a low-level controller 108A for the right wheel. The low-level controller 106A for the left wheel 106A controls a motor 118A for the left wheel of the device. The low-level controller 168A for the right wheel controls a motor 120A for the right wheel of the device. Each of the left wheels (not shown) and the right wheels (not shown) may perform forward or reverse movement by rotating in a specific directions at a specified rate. This way, the two motors may be independently controlled to operate at different rotational speeds for the device to perform linear and/or angular movement depending on rotations of the respective wheels. The device may perform a counter-clockwise angular motion along an arc toward left when the left wheel performs a forward rotation that is slower than the right wheel. In some aspect, the device may perform a counter-clockwise angular motion when the right wheel performs a forward rotation and the left wheel is stationary. The device may perform a counter-clockwise angular motion when the left wheel performs a backward (reverse) rotation and the right wheel is stationary. The device may counter-clockwise about a point when the left wheel performs a backward (reverse) rotation and the right wheel performs a forward rotation. The device may perform a clockwise angular motion through an arc toward right when the right wheel performs a slower forward rotation than the left wheel does. In some aspect, the device may perform a clockwise angular motion when the left wheel performs a forward rotation and the right wheel is stationary. The device may perform a clockwise angular motion when the right wheel performs a backward (reverse) rotation and the left wheel is stationary. The device may clockwise about a point when the right wheel performs a backward (reverse) rotation and the left wheel performs a forward rotation. The device may make a forward linear motion when the right wheel and the left wheel perform a forward rotation at the same rate.

In some aspect, all the controllers, IMU 114A, the trajectory generator 116A and the motors 118A may be implemented and executed on-board the device. In alternate aspects, some of the controllers may be implemented and executed on another device. For example, the command controller 102A may be executed on a smart phone or other wireless or wire-connected handsets and communicate with the device to load/unload the sets of controllers. The loadable controller sets 110A and 112A may be stored in a memory on the device or be transferred from a remote device via a network connection. In some other aspect, the loadable controller sets may be pre-loaded on-board the device for the command controller 102A to select which one of the controller sets to use based on a movement command type of the received movement command.

As should be appreciated, the various methods, devices, applications, features, etc., described with respect to FIG. 1A is not intended to limit the system 100A to being performed by the particular applications and features described. Accordingly, additional controller configurations may be used to practice the methods and systems herein and/or features and applications described may be excluded without departing from the methods and systems disclosed herein.

Figure 1B:
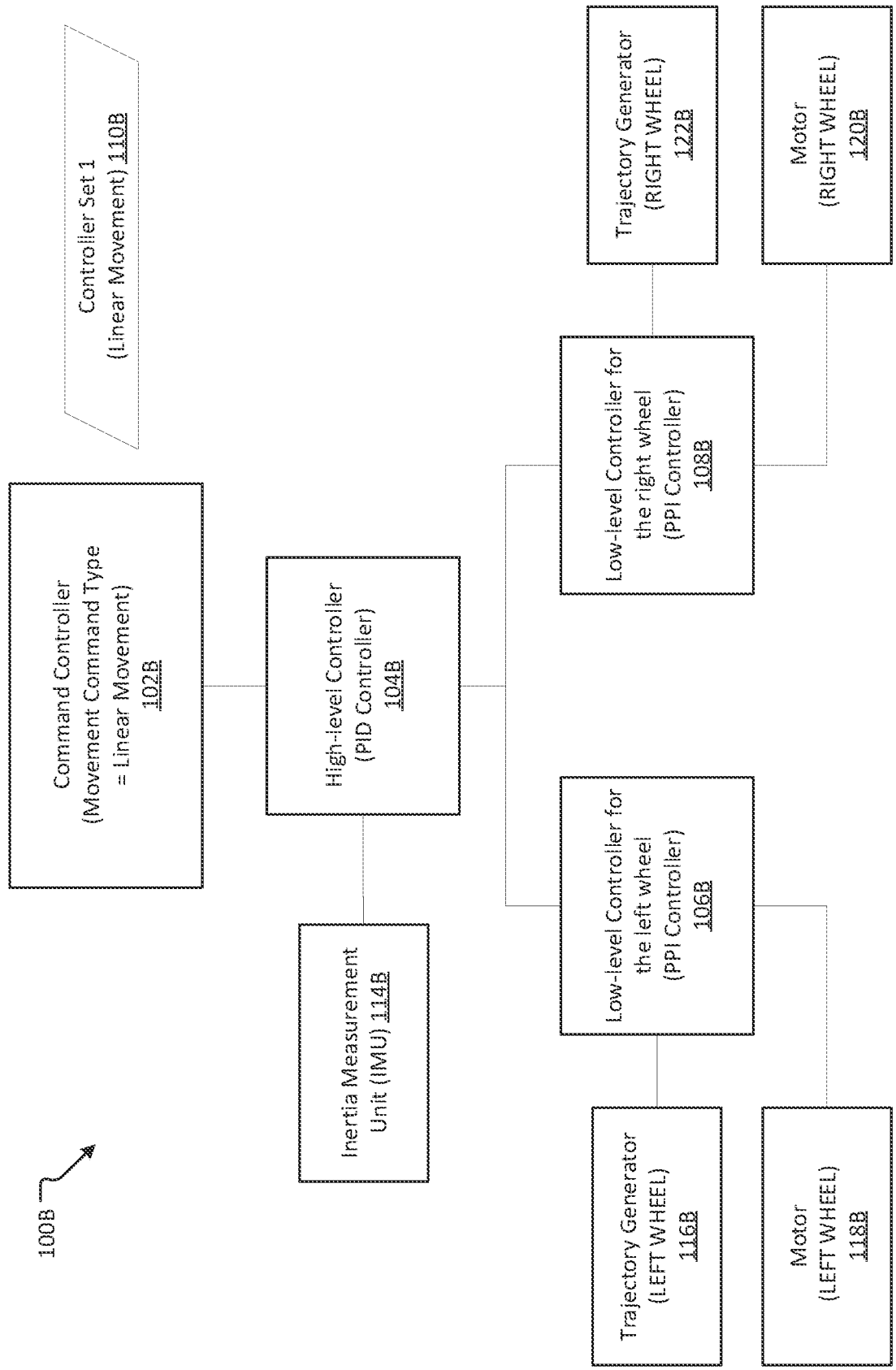

FIG. 1B illustrates an overview of an example system for a device movement control system when a movement command type is linear motion in accordance with aspects of the present disclosure. System 100B may represent a set of controllers, sensors, and motors of an exemplar programmable rover device for example. In an example, command controller 102B receives a linear movement command. In some aspect, the command controller 102B may determine the movement command type as being a linear movement when an angular velocity in the movement command is zero. In some other aspect, the command controller 102B may determine the movement command type as being a linear movement when an end heading is zero-degree, indicating that the heading does not change based on the movement command. In yet another example, the movement command may explicitly indicate that it is a linear movement command. The command controller 102B loads a controller set 1 (Linear Movement) 110B for example. The controller set 1 (Liner Movement) 110B specifies the command controller 102B to set a PID controller as a high-level controller 104B and a PPI controller as a low-level controllers 106B and 108B for the motors 118B and 120B for the left wheel and the right wheel respectively. The command controller 102B provides the movement command (linear motion) to the high-level controller (PID controller) 104B. The high-level controller (PID controller) 104B receives on-board sensor data from IMU 114B. The high-level controller (PID controller) 104B compares the received movement command with the on-board sensor data and generates instructions to respective low-level controllers (both PPI controllers) 106B and 108B. Each of the low-level controller (PPI controller) for the left wheel 106B and the low-level controller (PPI controller) for the right wheel 108B respectively receives trajectory profiles from the trajectory generator for the left wheel 116B and the trajectory generator for the right wheel 122B. In an alternate aspect, a single trajectory generator may be employed for both the left and right wheels. The respective PPI controllers compare the movement command as adjusted based on the on-board sensor from IMU 114B by the high-level controller (PID controller) 104 against the trajectory profiles from the respective trajectory generators 116B and 122B to determine signal levels to be sent to control the respective motors 118B and 120B for the left wheel and for the right wheel. The respective PPI controllers, acting as low-level controllers for their respective wheels, determine the rotations needed for respective wheels as the device as a whole ramps up its speed, maintains its speed at the speed based on the movement command, reduces its speed to stop at a time, heading, and position as specified by the movement command.

In some aspects, when a movement command type is linear motion, the high-level controller (a PID controller) controls locations along a linear path to ensure the movement is straight while correcting deviation based on data from IMU 114B. The low-level controllers (PPI controllers) controls a linear velocity and an end position (e.g., how fast to accelerate and then stop at the end position) by setting a signal levels to rotate respective motors 118B and 120B for the left wheel and the right wheel at specific rotational speeds based on a trajectory profile from the respective trajectory generators 116B and 122B.

As should be appreciated, the various methods, devices, applications, features, etc., described with respect to FIG. 1B is not intended to limit the system 100B to being performed by the particular applications and features described. Accordingly, additional controller configurations may be used to practice the methods and systems herein and/or features and applications described may be excluded without departing from the methods and systems disclosed herein.

Figure 1C:
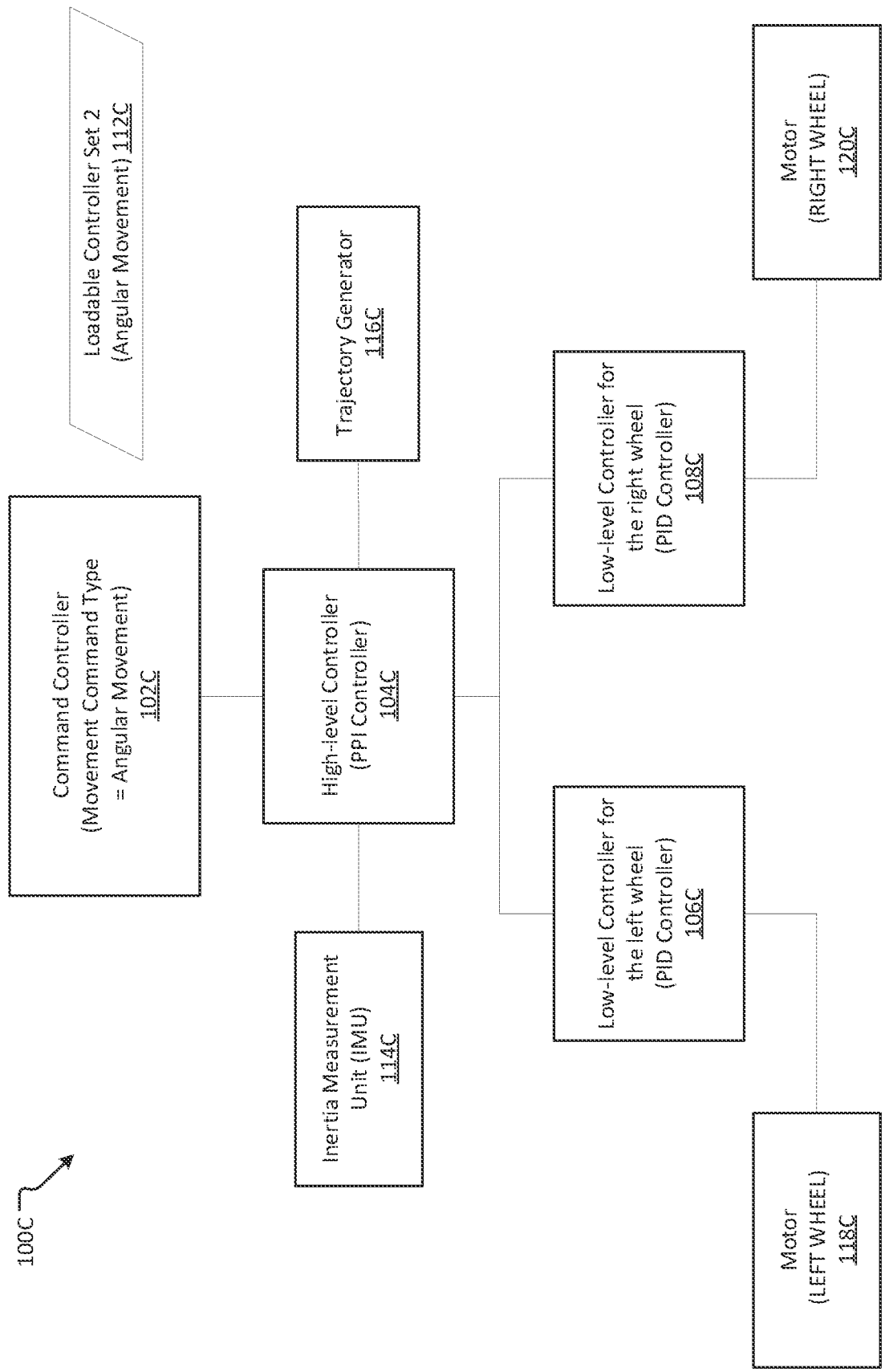

FIG. 1C illustrates an overview of an example system for a device movement control system when a movement command type is angular motion according to exemplary aspects of the present disclosure. System 100C may represent a set of controllers, sensors, and motors of an exemplary programmable rover device for example. Command controller 102C receives a movement command where its movement command type is an angular movement. In some aspects, the command controller 102C may determine the movement command type as being an angular motion when an angular velocity in the movement command is set as being a non-zero value. The command controller 102C may determine the movement command type as being an angular motion when either or both of a linear velocity and a linear end position are zero. In some aspect, the command controller 102 may determine a trajectory as an arc when either or both of a linear velocity and a linear end position being non-zero. The command controller 102 may determine turning in a place (i.e., turning about a point) when either or both of a linear velocity and a linear end position being zero. The command controller 102C loads a controller set 2 (Angular Movement) 112C for example. The controller set 2 (Angular Movement) 112C specifies the command controller 102C to set a PPI controller as a high-level controller 104C and a PID controller as a low-level controllers 106C and 108C for the motors 118C and 120C for the left wheel and the right wheel respectively. The command controller 102C provides the movement command (angular motion) to the high-level controller (PPI controller) 104C. The high-level controller (PPI controller) 104C receives on-board sensor data from IMU 114C.

The high-level controller (PPI controller) 104C compares the received movement command with the on-board sensor data and generates input commands to respective low-level controllers (both PID controllers) 106C and 108C. The high-level controller (PPI controller) 104C receives a trajectory profile from the trajectory generator 116C. The PPI controller adjusts the movement command based on the on-board sensor data from IMU 114C and the trajectory profile from the trajectory generator 116C and determines an instruction to each of the low-level controller (PID controller) 106C for left wheel and the low-level controller (PID controller) 108C for the right wheel. Based on the trajectory profile, the high-level controller (PPI controller) 104C determines the detailed motions of respective wheels based on the need for the device as a whole to ramp up its angular velocity, maintains its angular velocity at a steady speed based on the movement command, reduces its angular velocity to stop at a required time at a required heading as specified by the movement command. The low-level controllers 106C and 108C for the respective wheels receive instructions from the high-level controller (PPI controller) 104C and converts the instructions into signals to control rotations of respective motors 118C and 120C for the left wheel and the right wheel.

In some aspect, when a movement command type is angular movement, the high-level controller (a PPI controller) controls a rotation of the device (e.g., the programmable rover robot) at a particular rate of changes in the angle and the heading of the device by adjusting the movement command with an actual state of the device based on the on-board sensor data from the IMU 114 and a trajectory profile data from the trajectory generator 116C. The low-level controllers (PID controllers) maintains a linear velocity at a point that is tangent to the arc at a location to perform an angular movement.

As should be appreciated, the various methods, devices, applications, features, etc., described with respect to FIG. 1C is not intended to limit the system 100C to being performed by the particular applications and features described. Accordingly, additional controller configurations may be used to practice the methods and systems herein and/or features and applications described may be excluded without departing from the methods and systems disclosed herein. Further, while the exemplary systems depict devices including a set number of motors and wheels, one of skill in the art will appreciate that the aspects disclosed herein can be employed with devices having any number of engines or propulsion components (e.g., wheels, treads, propellers, etc.).

Figure 2:
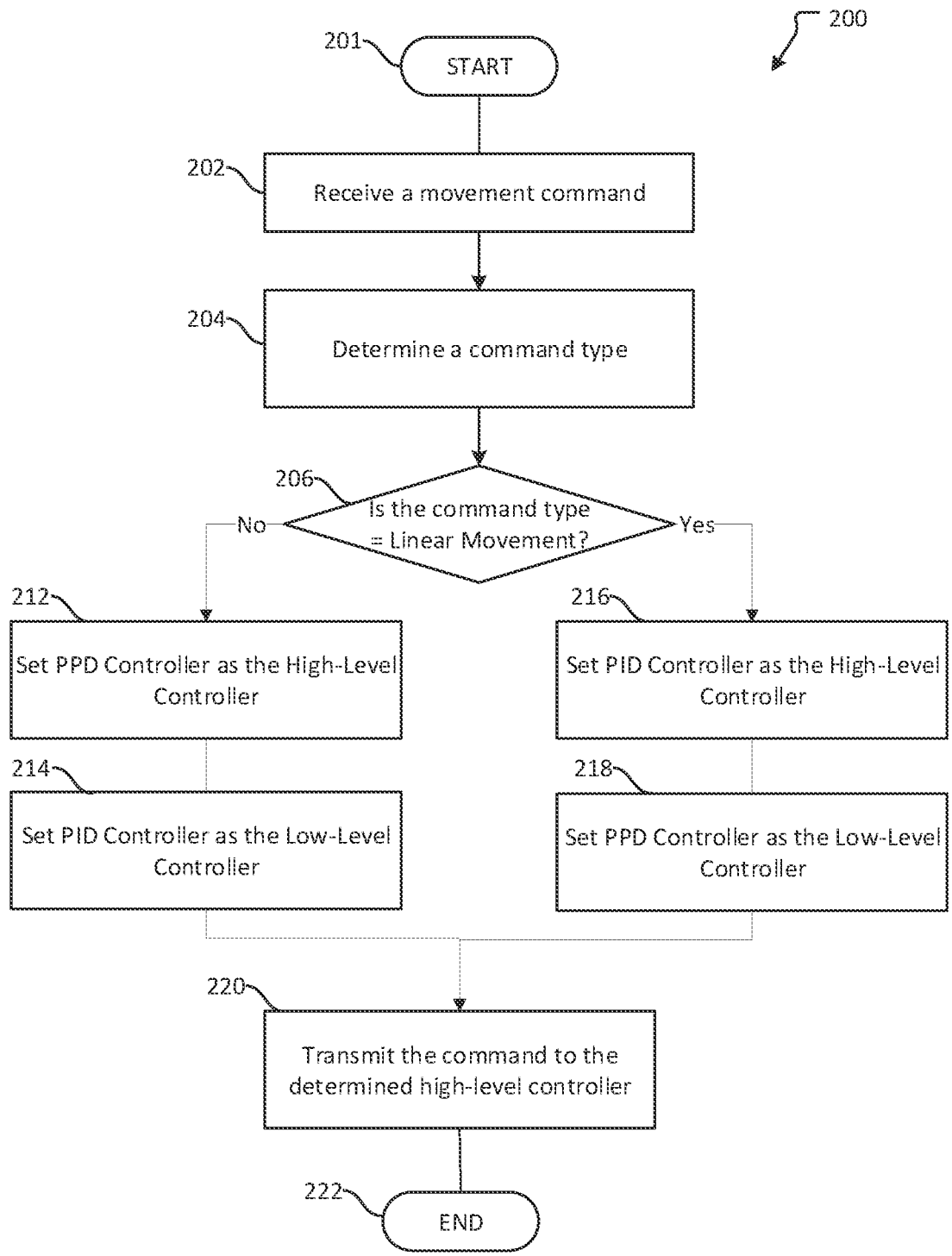

FIG. 2 illustrates an example of a method of controlling movement of a device based to a movement command according to an example system with which the disclosure may be practiced in accordance with aspects of the present disclosure.

A general order for the operations of the method 200 is shown in FIG. 2. Generally, the method 200 starts with a start operation 201 and ends with an end operation 222. The method 200 may include more or fewer steps or may arrange the order of the steps differently than those shown in FIG. 2. The method 200 can be executed as a set of computer-executable instructions executed by a computer system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, component, devices, modules, software, data structures, data characteristic representations, signaling diagrams, methods, etc. described in conjunction with FIGS. 1A-C, 3A-B, and 4.

The receive operation 202 may receive a movement command. The movement command may be received by the command controller 102A in FIG. 1A, for example. The movement command may be received from a remote device or loaded from on-board memory when the movement command is stored in one or more on-board memories of the device.

The determine operation 204 may determine a movement command type of the movement command. In some aspect, a device may provide at least two modes of movement: a linear movement and an angular movement. The linear movement is a movement in a straight line. The angular movement is a movement along an arc with a specified radius. Parameters of a movement command to control the device may include a linear velocity, a linear end position or distance of the movement, an angular velocity, an end heading, and a time duration. The linear velocity describes a velocity of the device in motion in terms a distance per a unit of time, a number of millimeters in second, for example. The linear end position describes a distance that the device needs to move, a number of millimeters for example, at a completion of executing the movement command. The angular velocity specifies a degree of angle per unit of time, 10 counter-clockwise degrees per second, for the device to turn. The end heading specifies a degree in angle, 90 degrees for example, where the device needs to head toward at the completion of executing the movement command. The time duration, 10 seconds for example, specifies a time duration of executing the movement command. The device movement command has a command type of a linear movement when the device movement command specifies its angular velocity as zero. The device movement command has a command type of an angular movement when a linear velocity is zero.

The decision operation 206 decides whether the movement command type of the received movement command is a linear movement. When the movement command type is a linear movement, flow branches "Yes" to the set operation 216 which sets a PID controller as the high-level controller. The high-level controller (PID controller) 104B is as shown in FIG. 1B. The set operation 218 determines one or more PPI controllers as the low-level controllers. The low-level controller for the left wheel (PPI controller) 106B is as shown in FIG. 1B. The low-level controller for the right wheel (PPI controller) 108B is as shown in FIG. 1B.

When the movement command type is angular movement, flow branches "No" to the set operation 212, which sets a PPI controller as the high-level controller. The high-level controller (PPI controller) 104C is as shown in FIG. 1C. The set operation 214 sets one or more PID controllers as low-level controllers. The low-level controller for the left wheel (PID controller) 106C is as shown in FIG. 1C. The low-level controller for the right wheel (PID controller) 108C is as shown in FIG. 1C.

In some aspect, the command controller 102A as shown in FIG. 1A may select a loadable controller set that matches with the movement command type such that the respective controllers are loaded on the device to process the received movement command. The transmit operation 220 transmits the movement command to the high-level controller as determined based on the movement command type of the received movement command.

As should be appreciated, operations 201-222 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figures 3A, 3B:
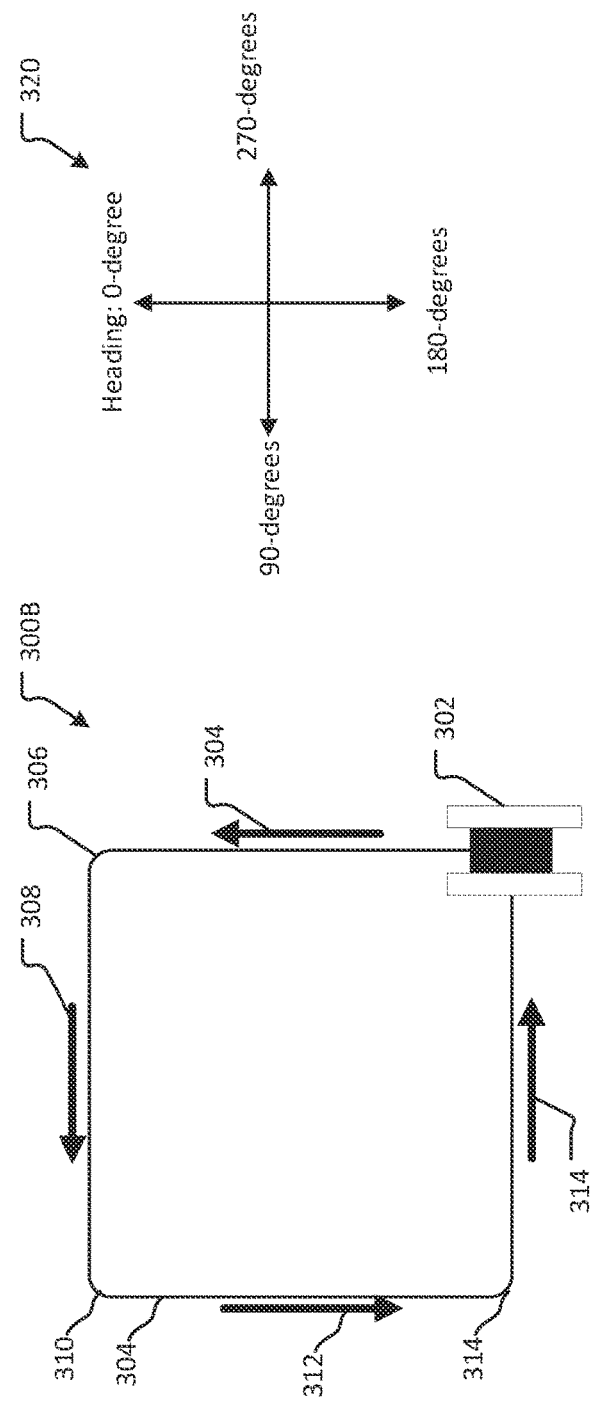

FIGS. 3A-B illustrate examples of movement commands and device movement according to an example system in which the disclosure may be practiced. In particular, FIG. 3A illustrates an example of a data structure in a form of a list of movement commands in sequence as the device performs a series of movements according to the movement commands to form a path in a form of a square with curved corners. The resulting path along with the device is as shown in FIG. 3B. The command controller 102A as illustrated in FIG. 1A may receive the movement commands, for example. FIG. 3B illustrates an example of the device making movements according to the movement commands in FIG. 3A. In particular, the device 302 performs a series of linear and angular movements to form a path 304 that is a square shape with curved corners. The angular reference 320 illustrates angles as the heading of the device 302. The heading of the device 302 as shown in FIG. 3B is currently zero degree, for example.

The movement commands 300A in FIG. 3A includes a sequence movement commands that the device 302 in FIG. 3B receives and performs. In the exemplary aspect, command ID 0001 is a movement command with parameters of a linear velocity of 1 centimeter per second, a linear end position of 5 centimeters, an angular velocity of zero degree, an end heading of zero degree, and a time duration of 5 seconds. The movement command is a linear motion command as indicated by the 0 angular velocity. The device 302, e.g., a programmable rover robot with two treads, for example, performs movement by rotating right tread (wheel) and/or left tread (wheel) as controlled by the high-level controllers and the low-level controllers as shown in FIGS. 1A-C.

Based on the movement command with command ID 0001, the device 302 loads a PID controller as a high-level controller 104B and PPI controllers as low-level controllers 106B and 108B, as shown in FIG. 1B. The device 302 performs a linear movement toward the direction 304 by accelerating to the steady linear velocity of one centimeter per second for five seconds and decelerates accordingly to stops at the linear end position of five centimeters, which is at a location 306 in FIG. 3B. While the device 302 performs the linear movement, the PID controller 104B receives sensor data from IMU 114B. The sensor data indicates the current, actual position and orientation of the device 302. The PID controller adjusts the parameters of the movement command based on the current, actual position and orientation of the device to correct possible deviation of the movement to generate input instructions to the low-level controllers (PPI controllers) for respective motors of the wheels. In some aspect, a frequency of the high-level controller generating the instructions to the low-level controllers may be 400 times per second, for example. The frequency of generating and transmitting commands to the low-level controllers and thus to the respective motors may be fixed or variable based on factors such as but not limited to types of movement and a level of accuracy required for controlling the device 302.

Each of the low-level controller (PPI controller) for the left wheel 106B and the low-level controller (PPI controller) for the right wheel 108B respectively receives trajectory profiles from the trajectory generator for the left wheel 116B and the trajectory generator for the right wheel 122B. The respective PPI controllers compare the movement command as adjusted based on the on-board sensor from IMU 114B by the high-level controller (PID controller) 104 against the trajectory profiles from the respective trajectory generators 116B and 122B to determine signal levels to be sent to control the respective motors 118B and 120B for the left wheel and for the right wheel. The respective PPI controllers as the low-level controllers for the respective wheels determines the detailed motions of respective wheels as the device as a whole accelerates, maintains its speed at the specified speed, and reduces its speed to stop at a the time, heading, and position as specified by the movement command. By processing the movement command with command ID 0001, the device 302 stops its linear movement at a location 306.

Next, a movement command with command ID 0002 includes a linear velocity of zero, a linear end position of zero, an angular velocity of 10 degrees per second, an end heading of 90 degrees for a time duration of 9 seconds. The command controller 102A determines a movement command type of the movement command as an angular movement as its linear end position being zero. Accordingly, the device 302 at a location 306 performs an angular movement at an angular velocity of 10 degrees per seconds for 9 seconds, stopping at the end heading of 90 degrees at a location 306. As the device 302 performs the angular movement based on the movement command with command ID 0002, the command controller determines that the movement command type as an angular movement based on the values of the linear velocity and the linear end position of the movement command being zero. Accordingly, the command controller may determine and load a PPI controller as the high-level controller 104C and a PID controller as each of the low-level controllers 106C and 108C as shown in FIG. 1C. The command controller 102C as shown in FIG. 1C transmits the movement command to the high-level controller (PPI controller) 104C for processing the movement command. In addition to the movement command, the PPI controller receives sensor data from IMU 114C and a trajectory profile from the trajectory generator 116C.

The high-level controller (PPI controller) 104C compares the received movement command with the on-board sensor data and generates input commands to respective low-level controllers (both PID controllers) 106C and 108C. The high-level controller (PPI controller) receives a trajectory profile from the trajectory generator 116C. The PPI controller compares the movement command as adjusted based on the on-board sensor from IMU 114C against the trajectory profile from the trajectory generator 116C to determine an instruction to each of a low-level controllers (PID controller) 106C for left wheel and a low-level controller (PID controller) 108C for the right wheel. Based on the trajectory profile, the high-level controller (PPI controller) 104C determines the detailed motions of the respective wheels as the device as a whole accelerates its rotation, maintains its speed at the speed based on the movement command, reduces its speed to stop at a time, heading, and position as specified by the movement command. The low-level controllers (PID controllers) 106C and 108C for the respective wheels receives instructions from the high-level controller (PPI controller) 104C and converts the instructions into signals to control respective motors 118C and 120C for the left wheel and the right wheel. Upon processing the movement command with command ID=0002, the device 302 stops its angular movement at its heading of 90 degrees at a location 306.

Processing of the rest of the movement commands may be performed similarly, depending on the movement command types. A movement command with command ID=0003 instructs the device 302 to perform a linear movement from a location 306 along the arrow 308 and to stop at a location 310. A movement command with command ID=0004 causes the device 302 to perform an angular movement to turn 90 degrees counter-clockwise at the location 310, stopping at the end heading of 180 degrees. A movement command with command ID=0005 causes the devices 302 to perform a linear movement along the arrow 312 and stops at a location 314. A movement command with command ID=0006 causes the device 302 to perform an angular movement for 90 degrees counter-clockwise and stops at the end heading of 270 degrees. A movement command with command ID=0007 causes the device 302 to perform a linear movement along the arrow 314 and stops at the initial location of the device 302 as shown in FIG. 3B. Finally, a movement command with command ID=0008 causes the device to perform an angular movement for 90 degrees counter-clockwise and stops at the end heading of 10, coinciding with the initial position and the initial heading of the device 302 as shown in FIG. 3B.

In some aspects, the device performs the underlying operations to accurately control the movement of the device based on the movement commands with parameters that are simple and intuitive. In particular, the command controller determines a set of the high-level controller and the low-level controllers based on a movement command type, loads the respective controllers, and transmits the movement command to the high-level controller. The high-level controller generates instructions to the low-level controllers based on the received movement command and the actual position and orientation data of the device from IMU to recover from deviations and time-delays of actual status of the device. The PPI controller, whether the PPI controller is used as a high-level controller during a linear movement or low-level controllers during an angular movement, adjusts the instructions based on a trajectory profile received from the trajectory generator for ramping up the speed, maintaining the steady speed, and reducing the speed to complete the movement command. The low-level controllers converts the instructions to signals to control respective motors.

Figure 4:
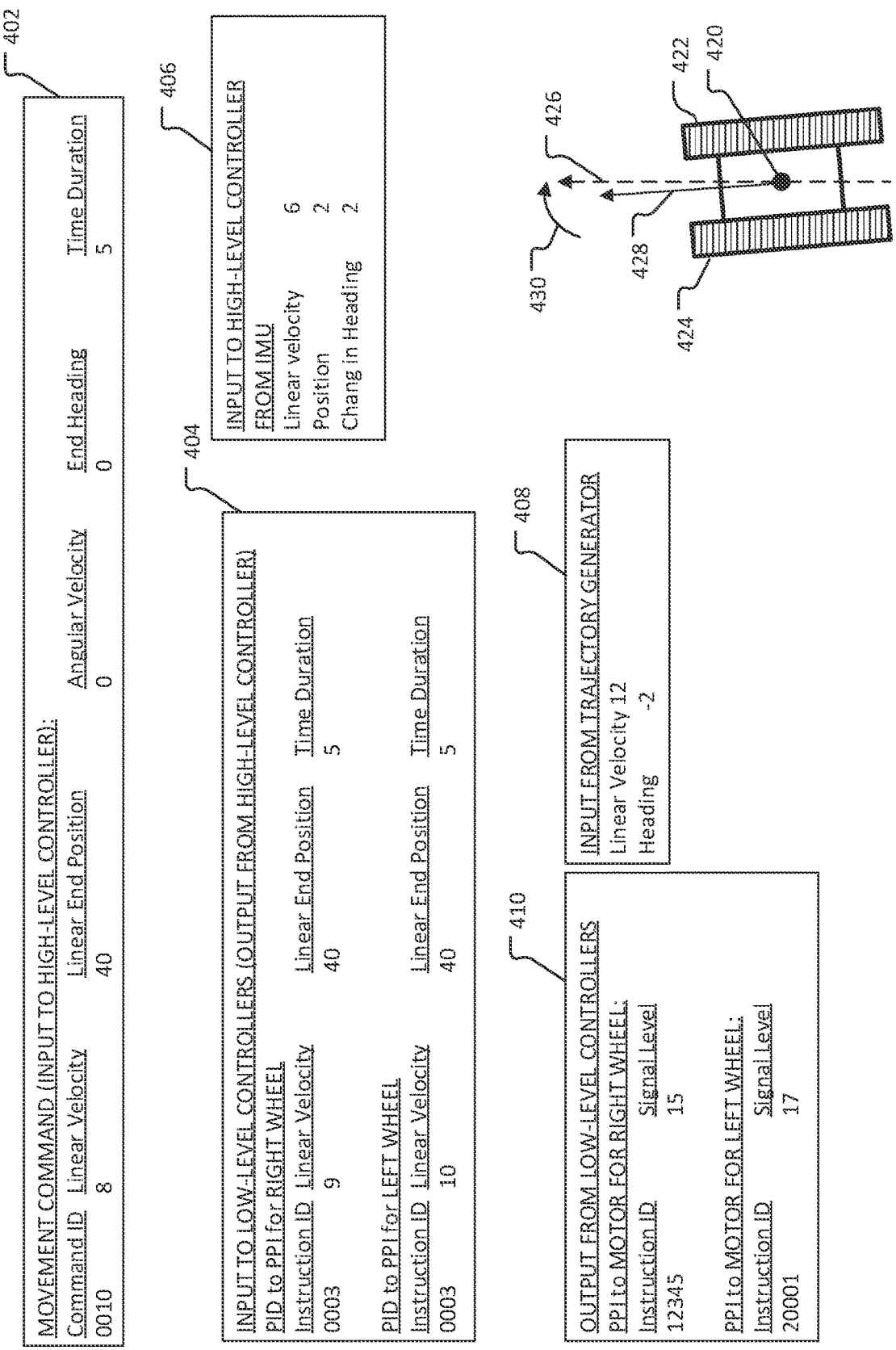
FIG. 4 illustrates an example of movement commands and device control instructions for controlling movement of a device in accordance with aspects of the present disclosure.

FIG. 4 illustrates an example of movement commands and device control instructions for controlling movement of a device in accordance with aspects of the present disclosure. In particular, FIG. 4 illustrates an example of a data structure of a movement command and data structures of instructions to low-level controllers and a data structure of signals to respective motors for the right wheel and the left wheel of the device, while an The movement command 402 has command ID of 0010 with parameters of a linear velocity of 8 cm/second, a linear end position at 40 cm, an angular velocity of zero degree per second, an end heading of zero degree, and the time duration of 5 seconds. It is a linear movement at a steady linear velocity at 8 cm/second for 5 seconds and stopping at the linear end position at 40 cm.

The device as shown in FIG. 4 is at 420, instructed to perform a linear movement toward the direction (heading=zero degree) 426. The device however deviates by currently having a heading of 2 degrees as shown in the heading direction arrow 428. Thus, the rotations of the right wheel 422 and the left wheel 424 needs to be adjusted to perform the correction 430 in heading while moving toward the direction 426 to complete the movement command with command ID=0010.

The command controller transmits the movement command to the high-level controller, which is a PID controller, as shown as the high-level controller (PID controller) 104B in FIG. 1B. Input data to the high-level controller from IMU 114B is shown in 406. The input data depicts the current linear velocity at 6 cm/second, the current position of the device 420 as 2 cm (e.g., at 2 cm into the linear movement based on the movement command). The input data from IMU 114B also indicates the current change in heading of 2 degrees. Here, IMU 114B indicates that the current linear velocity (6 cm/second) is below the steady linear velocity of 8 cm/second based on the movement command. Moreover, the current change of heading of the device at 2 degree shows deviation of heading as the movement commands indicates a linear movement, which instructs the device to maintain its heading angle.

Accordingly, the high-level controller (PID controller) 104B takes into account the original movement command and the current position and change in heading to generate input to the low-level controllers (PPI controllers) 106B and 108B as shown in FIG. 1B. That is, the high-level controller (PID controller) 104B instructs the low-level controllers (PPI controllers) 106B and 108B to cause the device to correct its angular heading by 2 degrees and move faster to catch up to the speed to achieve the linear end position within the remaining time as directed by the movement command.

The input 404 in the example indicates instructions for respective low-level controllers (PPI controllers) 106B and 108B. In particular, the input to the low-level controller (PPI controller) 108 B for the right wheel indicates a linear velocity of 9 cm/second to a linear end position of 40 cm within the time duration of 5 seconds. The input to the low-level controller (PPI controller) 106B for the left wheel indicates a linear velocity of 10 cm/second to a linear end position of 40 cm within the time duration of 5 seconds. In the example, the PPI controllers receives a trajectory profile from the trajectory generators 116B and 122B, respectively. The trajectory profiles indicate the linear velocity needed as the device ramps up its speed to achieve the steady linear velocity of 8 cm/second and completes the linear movement based on the movement command. For example, the input 408 from the trajectory generator indicates a new linear velocity of 12 cm/second with correction of heading at minus 2 degrees to further ramp-up its speed to catch up to the pace according to the movement command.

Accordingly, the output from the low-level controllers (PPI controllers) 106B and 108B to respective motors 118B and 120B is shown in 410. In particular, the low-level controller (PPI controller) to the motor 120B for the right wheel instructs a signal level, which may translate into a forward rotation of the right wheel at a signal level 15. The low-level controller (PPI controller) to the motor 118B for the right wheel instructs a signal level, which may translate into a forward rotation of the right wheel at a signal level 17. That is, the right wheel rotates slower than the left wheel, causing the device to rotate counter-clockwise to correct the angular deviation of 2 degrees while making a linear movement at a linear velocity that is faster to catch up to perform the movement trajectory as required by the movement command.

Figure 5:
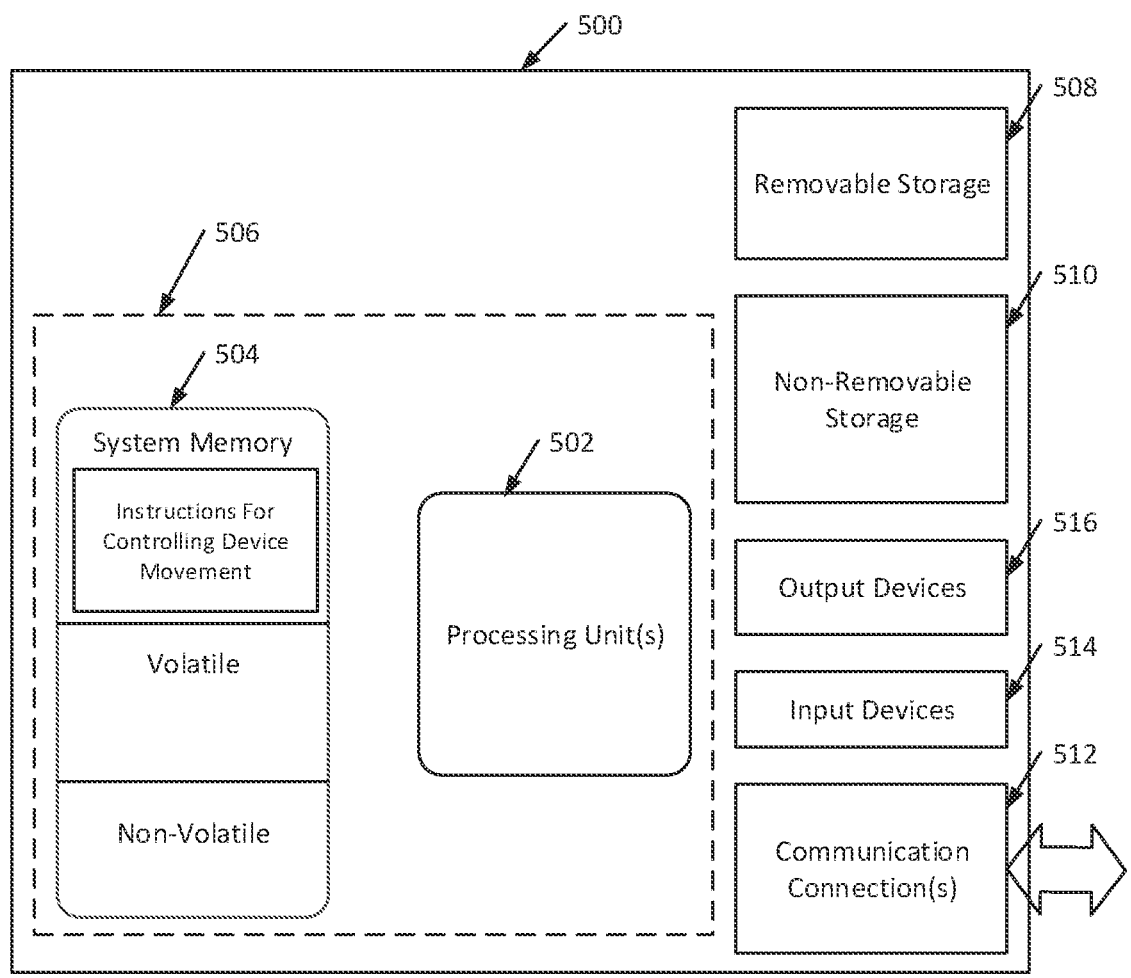
FIG. 5 illustrates a simplified block diagram of the device with which aspects of the present disclosure may be practiced in accordance with aspects of the present disclosure.

FIG. 5 illustrates a simplified block diagram of the device with which aspects of the present disclosure may be practiced in accordance with aspects of the present disclosure. One or more of the present embodiments may be implemented in an operating environment 400. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 500 typically includes at least one processing unit 502 and memory 504. Depending on the exact configuration and type of computing device, memory 504 (instructions to perform controlling device movement techniques as described herein) may be volatile (such as RAM), non-volatile (such as ROM, flash memory, etc.), or some combination of the two. This most basic configuration is illustrated in FIG. 5 by dashed line 506. Further, the operating environment 500 may also include storage devices (removable, 508, and/or non-removable, 510) including, but not limited to, magnetic or optical disks or tape. Similarly, the operating environment 500 may also have input device(s) 514 such as keyboard, mouse, pen, voice input, on-board sensors, etc. and/or output device(s) 516 such as a display, speakers, printer, motors, etc. Also included in the environment may be one or more communication connections, 512, such as LAN, WAN, a near-field communications network, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

An aspect herein can include a computer-implemented method for controlling device movement, the method comprising: receiving a movement command; determining a command type of the movement command, wherein the command type comprises at least one of a linear movement and an angular movement; determining a first controller and a second controller based on the determined command type, wherein the first controller controlling a destination of the device movement based on the movement command and the second controller correcting a deviation of the device movement toward the destination; when the determined command type is the linear movement, set the first controller being a proportional integral derivative (PID) controller and the second controller being a proportional/proportional integral (PPI) controller; when the determined command type is the angular movement, set the first controller being the PPI controller and the second controller being the PID controller; and transmitting the movement command to the first controller.

One or more of the above aspects comprise: a linear velocity, a linear end position, an angular velocity, and an end heading.

One or more of the above aspects comprise receiving, by the first controller, a set of current status of the device movement based on inertial measurement; and updating the movement command based on the set of the current status.

One or more of the above aspects comprise receiving, by the PPI controller, a trajectory profile, wherein the trajectory profile comprises a current position, a new position, and a position derivative to correct a deviation of the device movement from the movement command; and generating, by the PPI controller, an output instruction based on the received trajectory profile and the movement command.

One or more of the above aspects, wherein the command type of the movement command is the linear movement when the angular velocity is zero.

One or more of the above aspects, wherein the command type of the movement command is the angular movement when the angular velocity is non-zero.

One or more of the above aspects, wherein the command type of the movement command is an angular movement when the linear velocity is zero.

One or more of the above aspects comprise modifying, by the PPI controller, the received movement command based on movement phases of the device movement, wherein the movement phases comprise: accelerating the device movement to the speed as specified by the movement command; maintaining the speed of the device movement as specified by the movement command; reducing the speed of the device movement as specified by the movement command; and stopping the device movement as specified by the movement command.

One or more of the above aspects, wherein the first controller is a high-level controller and the second controller is a low-level controller, and wherein the high-level controller controls the low-level controller based on a deviation of device movement from the movement command, and wherein the low-level controller controls at least one motor used for the device movement.

One or more of the above aspects, wherein the movement command comprises a linear velocity and a linear distance when the determined command type of the movement command is a linear movement, and wherein the movement command comprises an angular velocity and an end heading when the determined command type of the movement command is an angular movement.

An aspect herein can include a programmable device, comprising: at least one processing unit; and at least one memory storing computer executable instructions for controlling device movement, the instructions when executed by the at least one processing unit causing the programmable movement device to: receive a movement command; determine a command type of the movement command, wherein the command type comprises at least one of a linear motion command and an angular motion command; determine a first controller and a second controller based on the determined command type, wherein the first controller controlling a destination of the device movement based on the movement command and the second controller correcting a deviation of the device movement toward the destination; when the determined command type is the linear motion, set the first controller being a proportional integral derivative (PID) controller and the second controller being a proportional/proportional integral (PPI) controller; when the determined command type is the angular motion command, set the first controller being the PPI controller and the second controller being the PID controller; and transmit the movement command to the first controller.

One or more of the above aspects, wherein the movement command comprises: a linear velocity, a linear end position, an angular velocity, and an end heading.

One or more of the above aspects comprise receiving, by the first controller, a set of current status of the device movement based on inertial measurement; and updating the movement command based on the set of the current status.

One or more of the above aspects comprise receiving, by the PPI controller, a trajectory profile, wherein the trajectory profile comprises a current position, a new position, and a position derivative to correct a deviation of the device movement from the movement command; and generating, by the PPI controller, an output instruction based on the received trajectory profile and the movement command.

One or more of the above aspects, wherein the command type of the movement command is the linear movement when the angular velocity is zero.

An aspect herein can include a computer-readable storage medium storing computer-executable instructions for controlling device movement, the instructions when executed by at least one processing unit, cause the at least one processing unit to perform steps of: receive a movement command; determine a command type of the movement command, wherein the command type comprises at least one of a linear motion command and an angular motion command; determine a first controller and a second controller based on the determined command type, wherein the first controller controlling a destination of the device movement based on the movement command and the second controller correcting a deviation of the device movement toward the destination; when the determined command type is the linear motion, set the first controller being a proportional integral derivative (PID) controller and the second controller being a proportional/proportional integral (PPI) controller; when the determined command type is the angular motion command, set the first controller being the PPI controller and the second controller being the PID controller; and transmit the movement command to the first controller.

One or more of the above aspects, wherein the movement command comprises: a linear velocity, a linear end position, an angular velocity, and an end heading.

One or more of the above aspects, the steps further comprising: receiving, by the first controller, a set of current status of the device movement based on inertial measurement; and updating the movement command based on the set of the current status.

One or more of the above aspects, the steps further comprising: receiving, by the PPI controller, a trajectory profile, wherein the trajectory profile comprises a current position, a new position, and a position derivative to correct a deviation of the device movement from the movement command; and generating, by the PPI controller, an output instruction based on the received trajectory profile and the movement command.

One or more of the above aspects, wherein the command type of the movement command is the linear movement when the angular velocity is zero.

Any of the one or more above aspects in combination with any other of the one or more aspect. Any of the one or more aspects as described herein.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for controlling device movement, the method comprising:
   receiving a movement command;
   determining a command type of the movement command, wherein the command type comprises at least one of a linear movement and an angular movement;
   determining a first controller and a second controller based on the determined command type, wherein the first controller controlling a destination of the device movement based on the movement command and the second controller correcting a deviation of the device movement toward the destination;
   when the determined command type is the linear movement, set the first controller being a proportional-integral-derivative (PID) controller and the second controller being a proportional/proportional-integral (PPI) controller;
   when the determined command type is the angular movement, set the first controller being the PPI controller and the second controller being the PID controller;
   transmitting the movement command to the first controller, wherein the first controller generates and transmits one or more instructions to the second controller, and wherein the second controller generates and transmits, based on the one or more commands at one or more signal levels to a part of the device that controls the device movement; and
   rotating, by a motor connected to one or more wheels of the device, based on the one or more commands, the one or more wheels of the device as a part of the controlled device movement.

2. The computer-implemented method of claim 1, wherein the movement command comprises:
   a linear velocity;
   a linear end position;
   an angular velocity; and
   an end heading.

3. The computer-implemented method of claim 2, wherein the command type of the movement command is the linear movement when the angular velocity is zero.

4. The computer-implemented method of claim 2, wherein the command type of the movement command is the angular movement when the angular velocity is non-zero.

5. The computer-implemented method of claim 2, wherein the command type of the movement command is an angular movement when the linear velocity is zero.

6. The computer-implemented method of claim 5, further comprising:
   modifying, by the PPI controller, the received movement command based on movement phases of the device movement, wherein the movement phases comprise:
   accelerating the device movement to the speed as specified by the movement command;
   maintaining the speed of the device movement as specified by the movement command;
   reducing the speed of the device movement as specified by the movement command; and
   stopping the device movement as specified by the movement command.

7. The computer-implemented method of claim 2, wherein the first controller is a high-level controller and the second controller is a low-level controller, and wherein the high-level controller controls the low-level controller based on a deviation of device movement from the movement command, and wherein the low-level controller controls at least one motor used for the device movement.

8. The computer-implemented method of claim 2, wherein the movement command comprises a linear velocity and a linear distance when the determined command type of the movement command is a linear movement, and wherein the movement command comprises an angular velocity and an end heading when the determined command type of the movement command is an angular movement.

9. The computer-implemented method of claim 1, further comprising:
   receiving, by the first controller, a set of current status of the device movement based on inertial measurement; and
   updating the movement command based on the set of the current status.

10. The computer-implemented method of claim 1, further comprising:
receiving, by the PPI controller, a trajectory profile, wherein the trajectory profile comprises a current position, a new position, and a position derivative to correct a deviation of the device movement from the movement command; and
generating, by the PPI controller, an output instruction based on the received trajectory profile and the movement command.

11. A programmable device, comprising:
at least one processing unit; and
at least one memory storing computer executable instructions for controlling device movement, the instructions when executed by the at least one processing unit causing the programmable movement device to:
receive a movement command;
determine a command type of the movement command, wherein the command type comprises at least one of a linear motion command and an angular motion command;
determine a first controller and a second controller based on the determined command type, wherein the first controller controlling a destination of the device movement based on the movement command and the second controller correcting a deviation of the device movement toward the destination;
when the determined command type is the linear motion, set the first controller being a proportional-integral-derivative (PID) controller and the second controller being a proportional/proportional-integral (PPI) controller;
when the determined command type is the angular motion command, set the first controller being the PPI controller and the second controller being the PID controller;
transmit the movement command to the first controller, wherein the first controller generates and transmits one or more instructions to the second controller, and wherein the second controller generates and transmits one or more commands at one or more signal levels to a part of the device that controls the device movement; and
rotate, by a motor connected to one or more wheels of the device, based on the one or more commands at one or more signal levels, the one or more wheels of the device as a part of the controlled device movement.

12. The programmable movement device of claim 11, wherein the movement command comprises:
a linear velocity;
a linear end position;
an angular velocity; and
an end heading.

13. The programmable movement device of claim 12, wherein the command type of the movement command is the linear movement when the angular velocity is zero.

14. The programmable movement device of claim 11, further comprising:
receiving, by the first controller, a set of current status of the device movement based on inertial measurement; and
updating the movement command based on the set of the current status.

15. The programmable movement device of claim 11, further comprising:
receiving, by the PPI controller, a trajectory profile, wherein the trajectory profile comprises a current position, a new position, and a position derivative to correct a deviation of the device movement from the movement command; and
generating, by the PPI controller, an output instruction based on the received trajectory profile and the movement command.

16. A computer-readable storage medium storing computer-executable instructions for controlling a device's movement, the instructions when executed by at least one processing unit, cause the at least one processing unit to perform steps of:
receive a movement command;
determine a command type of the movement command, wherein the command type comprises at least one of a linear motion command and an angular motion command;
determine a first controller and a second controller based on the determined command type, wherein the first controller controlling a destination of the device movement based on the movement command and the second controller correcting a deviation of the device movement toward the destination;
when the determined command type is the linear motion, set the first controller being a proportional-integral-derivative (PID) controller and the second controller being a proportional/proportional-integral (PPI) controller;
when the determined command type is the angular motion command, set the first controller being the PPI controller and the second controller being the PID controller;
transmit the movement command to the first controller, wherein the first controller generates and transmits one or more instructions to the second controller, and wherein the second controller generates and transmits, based on the one or more commands at one or more signal levels to a part of the device that controls the device movement; and
rotate, by a motor connected to one or more wheels of the device, based on the one or more commands at one or more signal levels, the one or more wheels of the device as a part of the controlled device movement.

17. The computer-readable storage medium of claim 16, wherein the movement command comprises:
a linear velocity;
a linear end position;
an angular velocity; and
an end heading.

18. The computer-readable storage medium of claim 16, the steps further comprising:
receiving, by the first controller, a set of current status of the device movement based on inertial measurement; and
updating the movement command based on the set of the current status.

19. The computer-readable storage medium of claim 16, the steps further comprising:
receiving, by the PPI controller, a trajectory profile, wherein the trajectory profile comprises a current position, a new position, and a position derivative to correct a deviation of the device movement from the movement command; and
generating, by the PPI controller, an output instruction based on the received trajectory profile and the movement command.

20. The computer-readable storage medium of claim 16, wherein the command type of the movement command is the linear movement when the angular velocity is zero.

\* \* \* \* \*